United States Patent [19]

Srivastava

[11] Patent Number: 5,016,164

[45] Date of Patent: May 14, 1991

[54] COMPUTER SYSTEM HAVING DELAYED SAVE ON PROCEDURE CALLS

[75] Inventor: Aditya Srivastava, Richardson, Tex.

[73] Assignee: Texas Instruments Incorporated, Dallas, Tex.

[21] Appl. No.: 317,061

[22] Filed: Feb. 24, 1989

Related U.S. Application Data

[63] Continuation of Ser. No. 205,043, May 31, 1988, abandoned, which is a continuation of Ser. No. 854,219, Apr. 21, 1986, abandoned.

[51] Int. Cl.[5] ............................................. G06F 15/00
[52] U.S. Cl. .................................... 364/200; 364/261; 364/275; 364/244.3; 364/232.9
[58] Field of Search ............... 364/200 MS File, 300, 364/513, 900 MS File

[56] References Cited

U.S. PATENT DOCUMENTS

| | | | |
|---|---|---|---|
| 3,659,272 | 4/1972 | Price et al. | 364/200 |
| 4,546,432 | 10/1985 | Umemura et al. | 364/200 |
| 4,567,574 | 1/1986 | Saade et al. | 364/900 |
| 4,587,628 | 5/1986 | Archer et al. | 364/300 |
| 4,595,981 | 7/1986 | Leung | 364/300 |
| 4,648,044 | 3/1987 | Hardy et al. | 364/300 |
| 4,649,480 | 3/1987 | Ohki et al. | 364/300 |

FOREIGN PATENT DOCUMENTS 60-157640 8/1985 Japan .

OTHER PUBLICATIONS

Kluzhiak et al., "Prolog for Programmers", Academic Press, 1985, pp. 26, 27, 31.
Kowalski, "Logic for Problem Solving", North Holland, 1979, pp. 96, 111-113.

Primary Examiner—Thomas C. Lee
Attorney, Agent, or Firm—L. Joy Griebenow; James T. Comfort; Melvin Sharp

[57] ABSTRACT

In execution of PROLOG-type programs, certain information is not saved at the time a procedure call is made. Such information is saved only if it becomes necessary, and at that time is saved in a known manner. If subsequent events make it unnecessary to save that certain information, the time required to do so has not been spent, thus improving system performance.

9 Claims, 2 Drawing Sheets

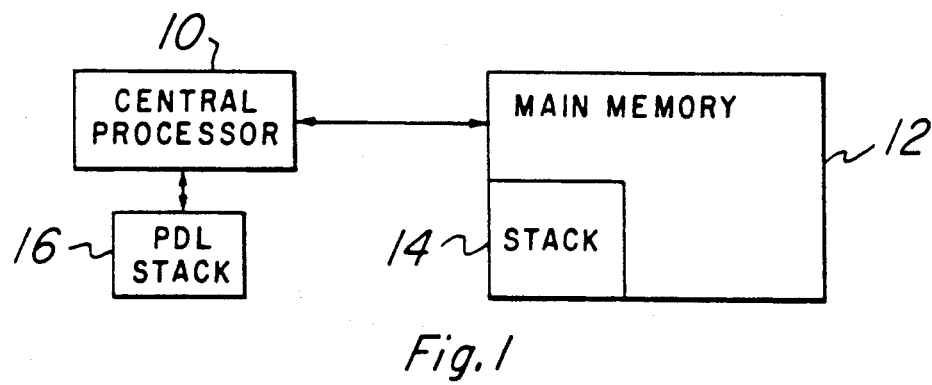
Fig. 1
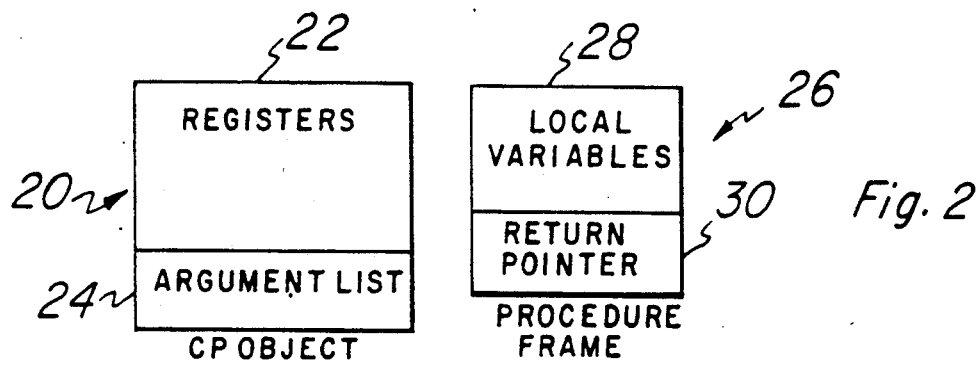
Fig. 2
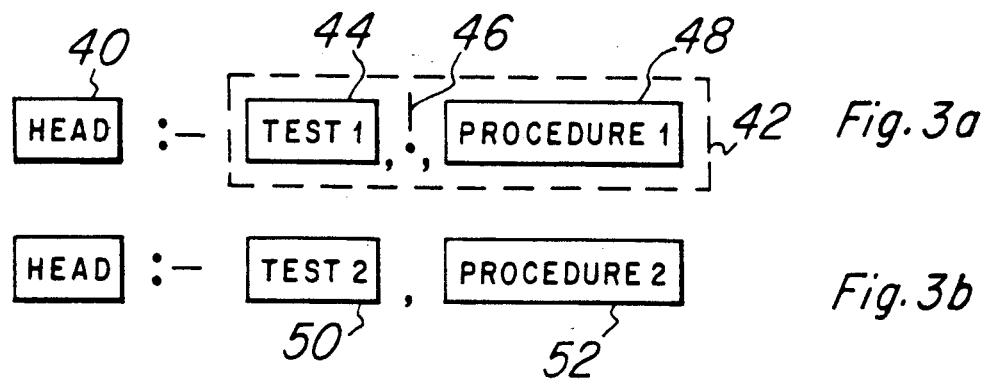
Fig. 3a
Fig. 3b

COMPUTER SYSTEM HAVING DELAYED SAVE ON PROCEDURE CALLS

This application is a continuation of application Ser. No. 205,043, filed May 31, 1988, now abandoned which is a continnation of application Ser. No. 854,219, filed 4/21/86, now abandoned.

BACKGROUND AND SUMMARY OF THE INVENTION

The present invention relates generally to computer systems and more specifically to a system for delaying storage of certain information when making procedure calls.

Logic programming languages such as PROLOG, because of a method of execution known as backtracking, must save the current machine state many times. This is because such programs execute by searching all alternatives when making procedure calls. When new alternatives are checked, the current machine state must be saved so that it can be restored if that particular search is not successful, ie., does not return a match, so that the search can be continued with another clause.

The fact that PROLOG-type languages make an extremely high number of non-deterministic procedure calls is an important contributor to the low performance typically achieved by PROLOG programs. It would be desirable for a PROLOG program to decrease the time and effort required to save the machine state when making a non-deterministic procedure call.

It is therefore an object of the present invention to improve performance of the execution of PROLOG-type languages by decreasing the system time used to make procedure calls.

Therefore, according to the present invention, the machine state is not saved when a procedure call is made. In some instances, portions of the information which are saved to define the machine state can be discarded. When saving of the machine state is delayed, encountering a situation which would delete that saved information means that it need not be saved at all. This improves overall system performance.

The novel features which characterize the present invention are defined by the appended claims. The foregoing and other objects and advantages of the present invention will hereafter appear, and for purposes of illustration, but not of limitation, a preferred embodiment is shown in the accompanying drawings.

BRIEF DESCRIPTION OF THE DRAWINGS

FIG. 1 is a block diagram of a processing system;

FIG. 2 is a memory map of a choice point object and a procedure frame;

FIGS. 3(a) and 3(b) show generic clauses relevant to the present invention; and

DESCRIPTION OF THE PREFERRED EMBODIMENT

Since PROLOG and related languages make an extremely large number of procedure calls during execution, an execution scheme which decreases the amount of system overhead necessary to make a procedure call can substantially increase the performance of the system. Such a technique will now be described in relation to FIG. 1 and FIG. 2.

Referring to FIG. 1, a central processor 10 is coupled to a main memory 12. The exact composition of the main memory 12 is not relevant to the present invention, but typically consists of a small, fast cache memory, a larger, slower semiconductor RAM and a mass storage device such as a disk (not shown). The main memory 12 is typically a virtual memory which requires that information within the virtual address space of the memory be paged to and from the disk.

A part of the main memory space is reserved for the system stack 14. This is a data structure where the system stores, among other things, information which is used to restore the state of the processor 10 upon return from a procedure call. Since it is part of the main memory, information on the stack may, from time to time, be paged to and from the mass storage device. Also coupled to the central processor is a PDL stack 16, which is a small amount of very high speed memory coupled directly to the processor 10.

Figure 4A:
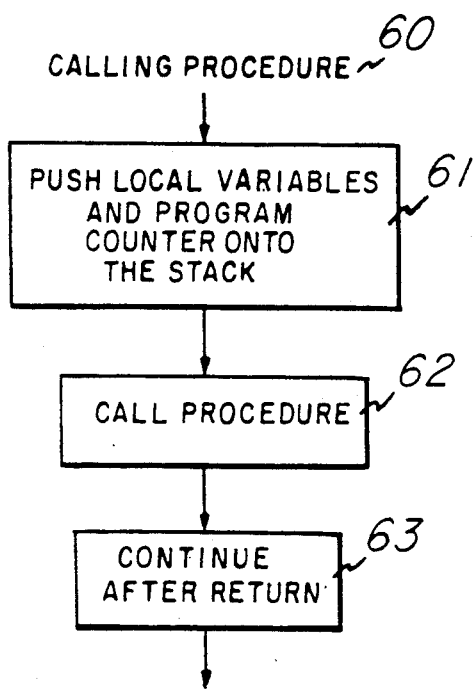
FIGS. 4A and 4B are block diagrams demonstrating the sequence of steps occurring when a procedure is called.
Figure 4B:
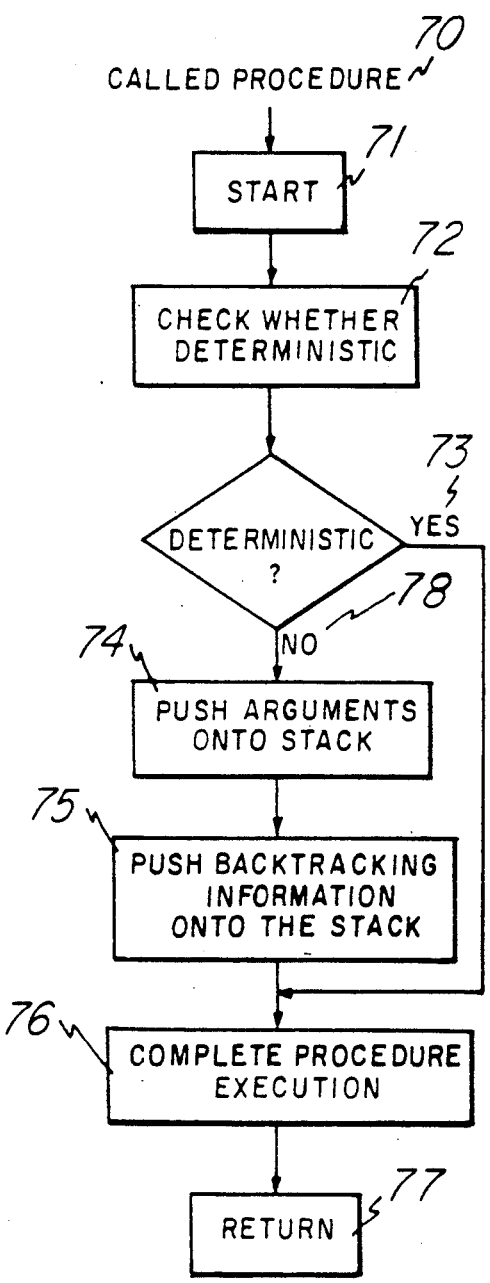

In prior art systems, when a non-deterministic procedure call is made, all information necessary to restore the processor to its current state is stored onto the stack 14. FIGS. 4A and 4B together show the sequence of steps that occur when the calling procedure (FIG. 4A) and the called procedure (FIG. 4B) are invoked. The data objects which must be stored to accomplish this is shown in FIG. 2. One data object is the Choice-Point Object 20 (CP Object) which contains the contents of the machine registers 22, and the argument list 24 to be passed to the called procedure 10. The second object to be saved is the procedure frame 26 which contains the current values of the local variables 28 in the calling procedure 60 as well as the return pointer 30 to the calling procedure. The size of this data object depends completely upon the specific details of the calling procedures. As an example of a typical system, the data stored in the CP Object 20 might be the contents of 12 registers and an argument list of 5 arguments both totalling 17 words. The procedure frame could contain, for example, six local variables plus a single return pointer, for a total of seven words. Thus in the prior art, a total of 24 words would be saved to the system stack 14 every time a procedure call is made.

According to the present invention, only a portion of this information is saved 61 at the time a procedure call is made 62. Then, if it becomes necessary, the remaining information can be saved 74, 75 to the stack 14. In many cases, events will transpire such that it is not necessary to save certain information to the stack 14, and thus the present invention will have saved the time required to save such information to the stack 14.

In the specific embodiment of the present invention, the procedure frame 26 is always stored 61 on the system stack at the time a procedure is entered 62. The CP Object 20 is not so stored, however. The argument list 24 is saved to the PDL stack, which is a very fast operation, and the registers are not saved at all. If it becomes necessary later, the registers and argument list will be saved 74, 75 to the system stack 14, but if it is not necessary to save the CP object 20, the time which would have been used to save the registers is saved, and the argument list 24 can easily be removed from the PDL stack 16. Since the PDL stack 16 is very fast, the time required to do this is very small.

In order to understand the situation in which it is not necessary to save the CP Object 20, it will be necessary to explain how a procedure executes. Table I shows the structure of a hypothetical procedure.

TABLE I

| | | | | |
|---|---|---|---|---|
| entry point | head | :- | body | (1) |
| | head | :- | body | (2) |
| | head | :- | body | (3) |
| | head | :- | body | (4) |
| exit point | | | | |

Execution of a PROLOG program consists in large part of entering procedures, checking in order the clauses contained within the procedure, and successfully returning 63 from the procedure as soon as a clause returns a successful match. If no matches are found, the procedure returns a non-successful result. Each of the clauses in turn usually invoke one or more procedures.

The purpose of the CP Object 20 is to allow the next clause in the procedure to be checked if a previous clause fails. Table I shows a procedure having four clauses, with each clause having an identical head portion. Execution of the procedure involves executing body (1) and successfully leaving the procedure if body (1) returns successfully. If body (1) does not return successfully, it is necessary to reset the processor 10 to the state it was in when the procedure was entered, and then try body (2). The information in the CP Object 20 is used to accomplish this. If body (2) is also unsuccessful, the CP Object 20 is used to reset the processor and body (3) is checked. It will be seen that the information of the CP Object 20 is that which is necessary to accomplish the backtracking feature of PROLOG-type languages. When the procedure terminates, either by a successful return from one of the bodies, or simply reaching the exit point, which indicates the entire procedure was unsuccessful, the procedure frame 26 is used to return 77 to the calling procedure and to restore the local variabes for that procedure. The procedure frame 26 consists of information which is similar to that used when procedure calls are made in other languages such as LISP or Pascal. The CP Object 20 contains that information needed to operate the backtracking feature which is peculiar to PROLOG-type languages.

The present invention consists of not storing the CP Object 20 onto the system stack unless it is necessary. In many cases, a simple test contained within body (1) will indicate that it is unnecessary to try the remaining clauses in the procedure in order to determine if that procedure is successful. This is often referred to as the procedure becoming deterministic 73. If this is the case, whether or not the procedure is successful depends entirely upon the content of body (1). Since there will be no backtracking within the procedure, any time and effort used to save a CP Object 20 has been wasted. In the present invention, the CP Object 20 is not saved until it is determined 78 that a backtracking operation might be necessary as shown in FIG. 4B.

FIGS. 3(a) and 3(b) show the type of statements which are relevant to such a determination. FIG. 3(a) shows a single clause, consisting of a head 40 and a body 42. The body consists of TEST1 44, a cut 46, shown as an exclamation mark, and a procedure call 48. TEST1 is a PROLOG built-in procedure, such as an arithmetic or logical comparison, which does not affect the values of the registers 22. TEST1 may affect the values of the argument list 24, which requires that it be saved. PROCEDURE1 can be any PROLOG procedure call. Execution of the clause of FIG. 3(a) proceeds in the following manner as shown in FIG. 4B: The test TEST1 72 is executed. If TEST1 fails 73, the body 42 of the clause as a whole must fail, and it is unnecessary to execute any more statements within the body 42. Therefore, execution will pass to the next clause in the procedure (not shown). Since TEST1 was of a simple type which did not modify any of the registers 22, it can be seen that, as yet, it has not been necessary to save the CP Object 20 to the stack 14. The argument list is restored from the values saved on the PDL stack 16, since they may have been corrupted by execution of TEST1.

If TEST1 is successful, the following command is a cut command 46. The cut command is a signal to the system that this clause, and only this clause, is to be executed to determine whether or not the procedure terminates successfully. That is, this is a command which requires that no more backtracking be undertaken within this procedure, thus making the procedure deterministic 73. In prior art systems, the operation upon encountering a cut command would be to remove the already saved CP Object 20 from the stack. Since in the current invention the CP Object 20 has not been saved to the stack, it is necessary only to remove the argument list 24 from the PDL stack 16 according to step 76. Since the PDL stack 16 is very fast compared to main memory 12, this is a comparatively fast operation. In addition, in the present invention, no time had been spent in saving the CP Object 20 to main memory at all. After the cut command 46 is executed, PROCEDURE1 48 is then executed in a normal manner. Upon completion 76 of PROCEDURE1, the procedure which contains the clause of FIG. 3(a) is exited 77.

FIG. 3(b) shows one statement of the type which would require the CP Object 20 to be saved. TEST2 50 is a simple test of the type of TEST1, and if it is successful PROCEDURE2 52 is executed. However, since there is no cut command, if PROCEDURE2 52 is not successful the clauses following that of FIG. 3(b) will be executed after backtracking, therefore, PROCEDURE2 52 IS Non-deterministic 78. Thus, prior to entering PROCEDURE2 52 the called procedure 70. It is necessary that the CP Object 20 be saved 74, 75. The CP Object 20 is saved to the stack in the normal manner, and execution proceeds as in prior art systems.

If the compiler detects that any particular procedure can not become deterministic 78, saving 74, 75 of the CP Object to the stack 14 need not be delayed. This will happen, for example, if the cut command is not used anywhere in the procedure. In such cases, the compiler will operate in the same manner as prior art systems.

TECHNICAL ADVANTAGES

It can thus be seen that the present invention delays the saving of some information to the system stack 14 until it is determined that such a save is necessary. If the saving of this information is necessary it is done at a later time, but the system otherwise proceeds in the well known standard manner. If the save turns out not to be necessary, time has not been wasted in saving unneeded information to the system stack 14.

The actual compiler and processor used are not important to the present invention, but the present invention has been implemented on a compiler developed to run on a Texas Instruments Explorer. The compiler, which is itself written in PROLOG, executed from 30% to 40% faster when saving of the CP Object 20 was delayed. Many other PROLOG application programs also ran 30% to 40% faster when the present invention was implemented.

It will be appreciated that, in those cases where the CP Object 20 must be saved to the stack 14 anyway, a small amount of extra work is undertaken when saving the argument list 24 to the PDL stack 16 upon entry into the procedure. The fact that this is a fairly small penalty to be paid can be illustrated in connection with the above-described Explorer implementation. On the Explorer, the PDL stack 16 acts as a register within the processor 10 and data transfer from the argument list to the PDL stack 16 occurs at the rate of 1 word per clock cycle. In contrast, there is a minimum of 6 clock cycles to save each word to the system stack 14 in main memory 12. This time increases greatly whenever a page fault is encountered in main memory 12, necessitating a search of the mass storage disk. In the example given earlier, having 12 registers and 5 in the argument list, saving to system stack memory 14 requires a minimum of (6*17) or 104 clock cycles. A page fault would incur a penalty of typically many thousands of clock cycles. Compared to this large overhead in normal operation, the extra 5 clock cycles needed to save the argument list to the PDL stack becomes insignificant. Even if only a small percentage of procedures incorporate a cut command, and are therefore candidates to be more quickly executed by not saving the CP Object 20, overall system performance can be significantly improved.

It will be appreciated that computer systems having different configurations can take advantage of the present invention. For example, systems that don't have a PDL stack 16 can store the argument list 24 elsewhere, such as any dedicated memory location, on the main stack 14, or in other registers especially reserved for this purpose, and still take advantage of the temporal savings of delaying saving the register values 22 to the stack.

The present invention has been illustrated by the embodiment described above, and it will become apparent to those skilled in the art that various modifications and alterations may be made thereto. Such variations fall within the spirit of the present invention, the scope of which is defined by the appended claims.

What is claimed is:

1. A method for making non-deterministic procedure calls in a computer system having a stack, comprising the steps of:
   (a) saving on said stack of said computer system a first portion of then existing information necessary to return operation of said computer system from the procedure calls;
   (b) entering the procedure;
   (c) after step (b), determining whether a second portion of information necessary to do backtracking must also be saved on the stack of said computer system, said second portion of information existing in said computer system at the time of entering the procedure; and
   (d) saving on the stack of said computer system or discarding said second portion of information necessary to do backtracking in accordance with the determination of step (c).

2. The method of claim 1 wherein the first portion of information comprises local variables of the calling procedure and a return pointer.

3. The method of claim 1 wherein the second portion of information comprises contents of current system registers of said computer system and arguments which have been passed to the called procedure.

4. A method for making procedure calls in a nondeterministic program in a computer system having a system stack, comprising the steps of:
   (a) saving a procedure frame, said procedure frame existing in said computer system and including information necessary to return from a procedure call, to said system stack of said computer system while in a calling procedure;
   (b) entering a called procedure;
   (c) executing an instruction which determines whether or not the called procedure is deterministic; and
   (d) if the called procedure is not deterministic, saving a choice point object on the system stack of the computer system, said choice point object existing in the computer system at the time of entering the called procedure and including information necessary to do backtracking.

5. The method of claim 4 wherein the procedure frame contains local variables of the calling procedure and a return pointer.

6. The method of claim 4 wherein the choice-point object contains values of system registers of said computer system and an argument list which is passed from the calling procedure to the called procedure.

7. The method of claim 6 further comprising the step of:
   (e) prior to step (c), saving the argument list to a special memory location of said computer system.

8. A method for making procedure calls in a computer system having a stack and using a non-deterministic programming language utilizing backtracking, comprising the steps of:
   (a) saving a return pointer and local variables of a calling procedure on said stack of said computer system, said return pointer and said local variables then existing in the computer system;
   (b) entering a called procedure;
   (c) executing an instruction which establishes the called procedure as deterministic or non-deterministic; and
   (d) if the called procedure is established to be non-deterministic, saving onto said stack of said computer system information which is necessary to do backtracking, said information necessary to do backtracking existing in said computer system at the time of entering the procedure.

9. The method of claim 8, wherein the information necessary to do backtracking includes an argument list passed from the calling procedure.

* * * * *